(12) United States Patent
Yoon et al.

(10) Patent No.: US 10,533,888 B2
(45) Date of Patent: Jan. 14, 2020

(54) FUEL PUMP MODULE FOR MEASURING HEIGHT OF FUEL USING ULTRASONIC WAVE

(71) Applicant: COAVIS, Sejong-si (KR)

(72) Inventors: Jong Hyuk Yoon, Sejong-si (KR); Se Jin Kim, Sejong-si (KR); In Gon Kim, Sejong-si (KR)

(73) Assignee: COAVIS, Sejong-si (KR)

( * ) Notice: Subject to any disclaimer, the term of this patent is extended or adjusted under 35 U.S.C. 154(b) by 296 days.

(21) Appl. No.: 15/622,817

(22) Filed: Jun. 14, 2017

(65) Prior Publication Data

US 2017/0363049 A1 Dec. 21, 2017

(30) Foreign Application Priority Data

Jun. 16, 2016 (KR) .................. 10-2016-0074884

(51) Int. Cl.
*G01F 23/296* (2006.01)

(52) U.S. Cl.
CPC ........ *G01F 23/2962* (2013.01); *G01F 23/296* (2013.01); *G01F 23/2968* (2013.01); *Y10S 367/908* (2013.01)

(58) Field of Classification Search
CPC .... G01F 23/2962; G01F 23/296; G01F 23/00; G01F 23/28; G01F 23/2968; Y10S 367/908
See application file for complete search history.

(56) References Cited

U.S. PATENT DOCUMENTS

| | | | | |
|---|---|---|---|---|
| 4,909,080 A * | 3/1990 | Kikuta | ............... | G01F 23/2962 340/621 |
| 5,301,549 A * | 4/1994 | Sinclair | ............... | G01F 23/2961 340/621 |
| 5,303,585 A * | 4/1994 | Lichte | ................ | G01F 25/0061 367/908 |
| 5,309,763 A * | 5/1994 | Sinclair | ............... | G01F 23/2961 181/124 |
| 5,357,801 A * | 10/1994 | Sinclair | ............... | G01F 23/2962 181/124 |
| 7,334,464 B2 * | 2/2008 | Goto | ...................... | B64D 37/08 73/149 |
| 2004/0079149 A1 * | 4/2004 | Sawert | ................. | B06B 1/0292 73/290 V |
| 2006/0144139 A1 * | 7/2006 | Miyagawa | .......... | G01F 23/2962 73/290 V |

FOREIGN PATENT DOCUMENTS

| | | |
|---|---|---|
| JP | 2005134160 A | 5/2005 |
| KR | 1020150091140 A | 8/2015 |
| KR | 101620845 B1 | 5/2016 |

* cited by examiner

*Primary Examiner* — Ian J Lobo
(74) *Attorney, Agent, or Firm* — McCoy Russell LLP (57) ABSTRACT

Provided is a fuel pump module for measuring a height of fuel using an ultrasonic wave, and more particularly, a fuel pump module for measuring a height of fuel using an ultrasonic wave, where an ultrasonic wave sensor for measuring the height of the fuel contained in a fuel tank is integrally installed in the fuel pump module provided in the fuel tank.

9 Claims, 8 Drawing Sheets

FUEL PUMP MODULE FOR MEASURING HEIGHT OF FUEL USING ULTRASONIC WAVE

CROSS-REFERENCE TO RELATED APPLICATIONS

This application claims priority under 35 U.S.C. § 119 to Korean Patent Application No. 10-2016-0074884, filed on Jun. 16, 2016, in the Korean Intellectual Property Office, the disclosure of which is incorporated herein by reference in its entirety for all purposes.

TECHNICAL FIELD

The following disclosure relates to a fuel pump module for measuring a height of fuel using an ultrasonic wave, and more particularly, to a fuel pump module for measuring a height of fuel using an ultrasonic wave, where an ultrasonic wave sensor for measuring the height of the fuel contained in a fuel tank is integrally installed in the fuel pump module provided in the fuel tank.

BACKGROUND

In general, automobiles typically measure an amount of fuel in a fuel tank using an ultrasonic wave sensor to monitor the amount of fuel in the fuel tank. A height of the fuel in the fuel tank was measured by measuring a propagation time at which the ultrasonic wave signal travels from a bottom of the fuel tank to a surface height of the fuel.

In regard to this, the content of using an ultrasonic wave sensor to measure a height of fuel in a fuel tank is disclosed in Korean Patent Laid-Open Publication No. 10-2015-0091140 (published on Aug. 7, 2015, hereinafter, referred to as the related art). However, the related art has a problem that it is difficult to accurately measure the height of the fuel because a time at which an ultrasonic wave generated from the bottom of the fuel tank hits a side wall of the fuel tank and returns back is distorted.

In addition, in order to install the ultrasonic wave sensor in the fuel tank, the ultrasonic wave sensor is separately attached to a fuel tank module, or the fuel tank module and the ultrasonic wave sensor are each installed in the fuel tank. Therefore, in order to install the ultrasonic wave sensor and the fuel tank module, respectively, there is a problem in that a manufacturing process and costs are increased.

SUMMARY

An embodiment of the present invention is directed to providing a fuel pump module for measuring a height of fuel using an ultrasonic wave that may reduce a manufacturing process and costs by integrally installing an ultrasonic sensor in the fuel tank module.

Further, an embodiment of the present invention is directed to providing a fuel pump module for measuring a height of fuel using an ultrasonic wave that may measure the fuel in a fuel tank without distorting a propagation time of the ultrasonic wave by moving the ultrasonic wave into a tube.

In one general aspect, a fuel pump module for measuring a height of fuel in a fuel tank 10 using an ultrasonic wave includes: a reservoir part 21 provided to an outer surface of the fuel pump module 20; a tube 100 provided to the reservoir part 21, having a perforated part, and formed to be extended in a vertical direction of the reservoir part 21; and a fuel measuring part 200 coupled to a lower portion of the reservoir part 21 and having a sensor part measuring a height of fuel in a fuel tank 10 at a position corresponding to the perforated part.

The fuel measuring part 200 may include a first sliding part 250 formed to be sliding-coupled to the reservoir part 21, and the reservoir part 21 may include a second sliding part 251 formed to correspond to the first sliding part 250.

The fuel measuring part 200 may include a fixing protrusion 260 formed to be fixedly coupled to the reservoir part 21, and the reservoir part 21 may include a fixing groove 261 coupled to the fixing protrusion 260.

The fuel measuring part 200 may include a fuel measuring body 210 having one surface formed to be opened and including a circuit part and the sensor part which are molded therein; a connection line 230 connected to the circuit part and the sensor part and extended to the outside of the fuel measuring body 210; and a cover 220 coupled to one surface of the fuel measuring body 210.

The fuel measuring body 210 may further include a connector part 240 coupled to the connection line 230 and connected to the outside of the fuel tank 10.

The fuel measuring body 210 may include an ultrasonic wave generation space 270 formed to be depressed in a position corresponding to the tube 100 and including the sensor part to generate the ultrasonic wave.

A diameter of the ultrasonic wave generation space 270 may be formed to be smaller than an inner diameter of the tube 100.

The tube 100 may be formed to be extended in a vertical direction from the reservoir part 21 to an upper end in the fuel tank 10.

The tube 100 may be coupled to the upper end in the fuel tank 10, and has a circulation hole 120 formed to circulate air and fuel in the fuel tank 10.

The tube 100 and the fuel measuring part 200 may be formed to be spaced apart from each other so that the fuel in the fuel tank 10 is circulated.

DETAILED DESCRIPTION OF MAIN ELEMENTS

| | |
|---|---|
| 10: fuel tank | 11: fuel |
| 20: fuel pump module | |
| 21: reservoir part | 22: fuel measurement insertion space |
| 100: tube | |
| 120: circulation hole | |
| 200: fuel measuring part | 211: internal space |
| 210: fuel measuring body | 220: cover |
| 230: connection line | 240: connector part |
| 250: first sliding part | 251: second sliding part |
| 260: fixing protrusion | 261: fixing groove |
| 270: ultrasonic wave generation space | |

DETAILED DESCRIPTION OF EMBODIMENTS

The present invention may be variously modified and have various exemplary embodiments. Therefore, specific exemplary embodiments of the present invention will be illustrated in the accompanying drawings and be described in detail. However, it is to be understood that the present invention is not limited to a specific exemplary embodiment, but includes all modifications, equivalents, and substitutions without departing from the scope and spirit of the present invention.

It is to be understood that when one component is referred to as being "connected to" or "coupled to" another component, it may be connected directly to or coupled directly to another component but be connected to or coupled to another component while having the other component intervening therebetween.

Unless indicated otherwise, it is to be understood that all the terms used in the specification including technical or scientific terms have the same meaning as those that are generally understood by those who skilled in the art.

It should be understood that the terms defined in the dictionary which is generally used are identical with the meanings within the context of the related art, and they should not be ideally or excessively formally construed unless clearly defined otherwise in the present application.

Hereinafter, a technical spirit of the present invention will be described in more detail with reference to the accompanying drawings.

The accompanying drawings are only examples shown in order to describe the technical spirit of the present invention in more detail. Therefore, the technical spirit of the present invention is not limited to figures in the accompanying drawings.

Figure 1:
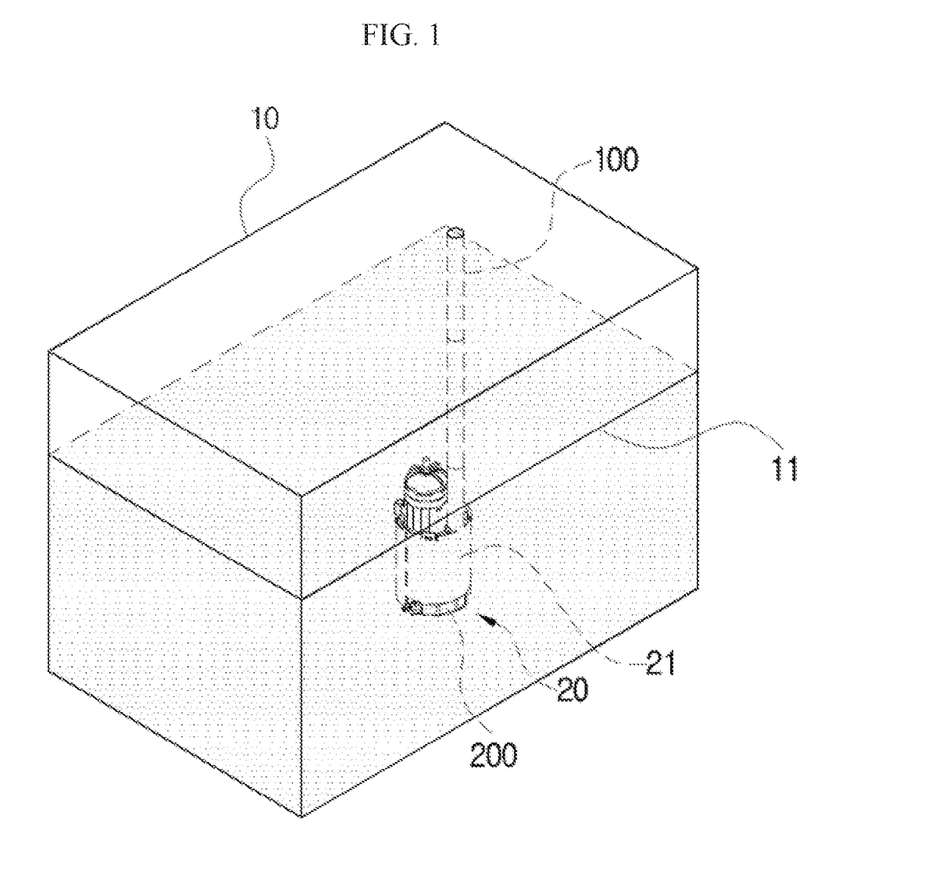
FIG. 1 is a perspective view of a fuel pump module mounted in a fuel tank according to an exemplary embodiment of the present invention.

Referring to FIG. 1, a fuel pump module for measuring a height of fuel using an ultrasonic wave according to an exemplary embodiment of the present invention is provided in a fuel tank 10, and measures the height of the fuel contained in the fuel tank 10 using an ultrasonic wave sensor. In this case, the fuel pump module 20 is preferably installed at a lower center in the fuel tank 10.

Such a fuel pump module 20 is configured to include a reservoir part 21, a tube 100, and a fuel measuring part 200.

The reservoir part 21 is provided to an outer surface of the fuel pump module 20.

The tube 100 is provided to the reservoir part 21, and is extended in a vertical direction from the reservoir part 21 such that an upper end of the tube 100 is formed to be close to the fuel tank 10. In addition, the tube 100 has a perforated part formed therein, and the fuel is contained in the perforated part.

The fuel measuring part 200 is coupled to a lower portion of the reservoir part 21, and a sensor part for measuring the height of the fuel in the fuel tank 10 is provided to a position corresponding to the perforated part. Here, as the sensor part, an ultrasonic wave sensor is preferably used. In addition, the sensor part measures the height of the fuel contained in the perforated part. Hereinafter, a method for measuring a height of fuel using an ultrasonic wave will be described below in detail.

Figure 2:
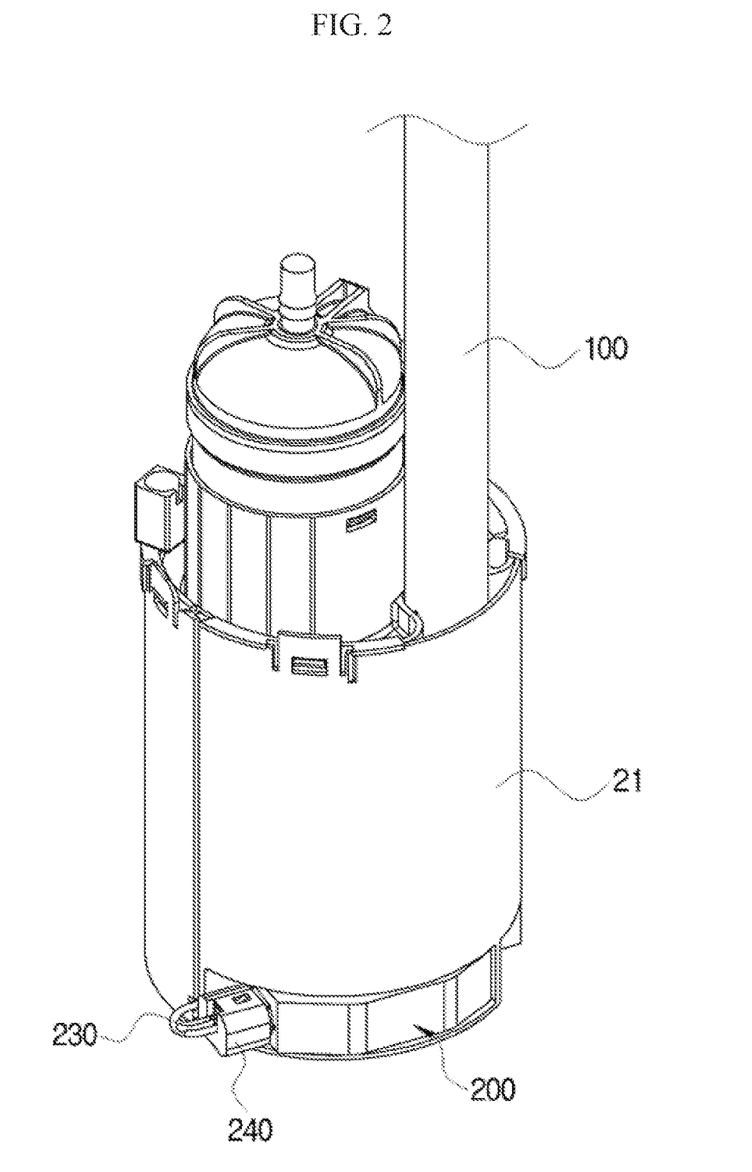
FIG. 2 is a perspective view illustrating a state in which a fuel measuring part is coupled to the fuel pump module according to an exemplary embodiment of the present invention.
Figure 3:
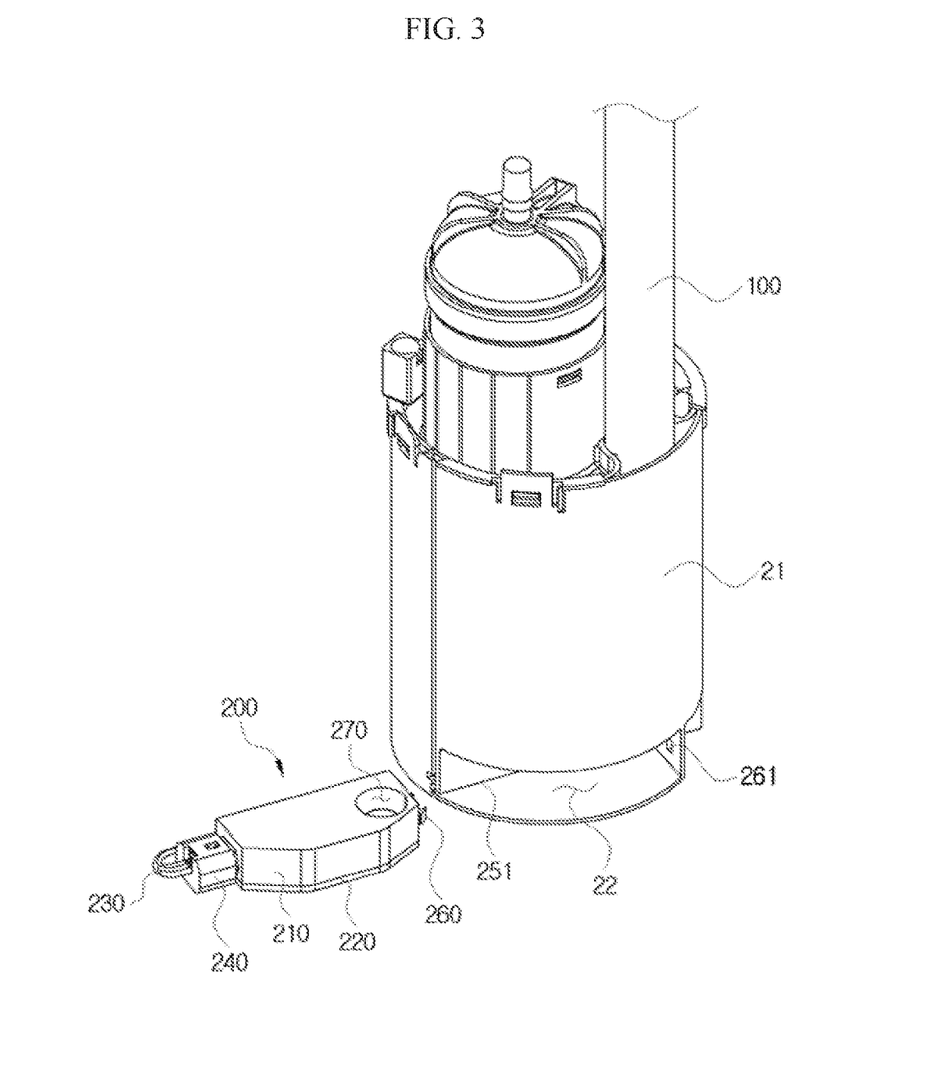
FIG. 3 is a perspective view illustrating a state in which the fuel pump module according to an exemplary embodiment of the present invention and the fuel measuring part are separated from each other.

As illustrated in FIGS. 2 and 3, the fuel measuring part 200 is coupled to the reservoir part 21 to be formed integrally with the reservoir part 21. As a result, according to the related art, since the fuel measuring sensor and the fuel pump module are each separately mounted, an assembly and production costs are increased, but according to the present invention, since the fuel measuring part is integrally coupled to the reservoir part 21 of the fuel pump module 20, and the fuel pump module 20 to which the fuel measuring part 200 is integrally coupled is coupled to the fuel tank 10, the assembly may be facilitated and the production costs may be reduced.

In more detail, as illustrated in FIGS. 2 and 3, the reservoir part 21 has a fuel measurement insertion space 22 formed in a lower portion thereof, where the fuel measuring part 200 is inserted into the fuel measurement insertion space 22. That is, it is preferable that the fuel measuring part 200 is inserted into the fuel measurement insertion space 22 so that the reservoir part 21 and the fuel measuring part 200 are integrally formed.

Figure 4:
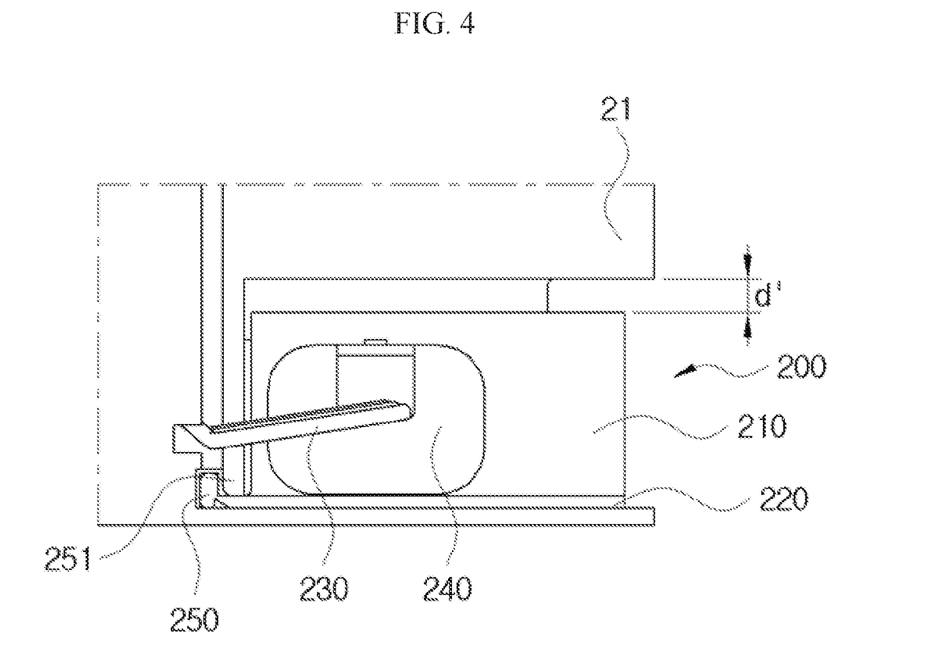
FIG. 4 is a side view illustrating a state in which a fuel measuring part is coupled to the fuel pump module according to an exemplary embodiment of the present invention.

As illustrated in FIG. 4, the fuel measuring part 200 includes a first sliding part 250 formed to be sliding-coupled to the reservoir part 21, and the reservoir part 21 is configured to include a second sliding part 251 formed to correspond to the first sliding part 250. Accordingly, the fuel measuring part 200 may be sliding-coupled to the reservoir part 21 by the first sliding part 250 and the second sliding part 251.

Figure 5:
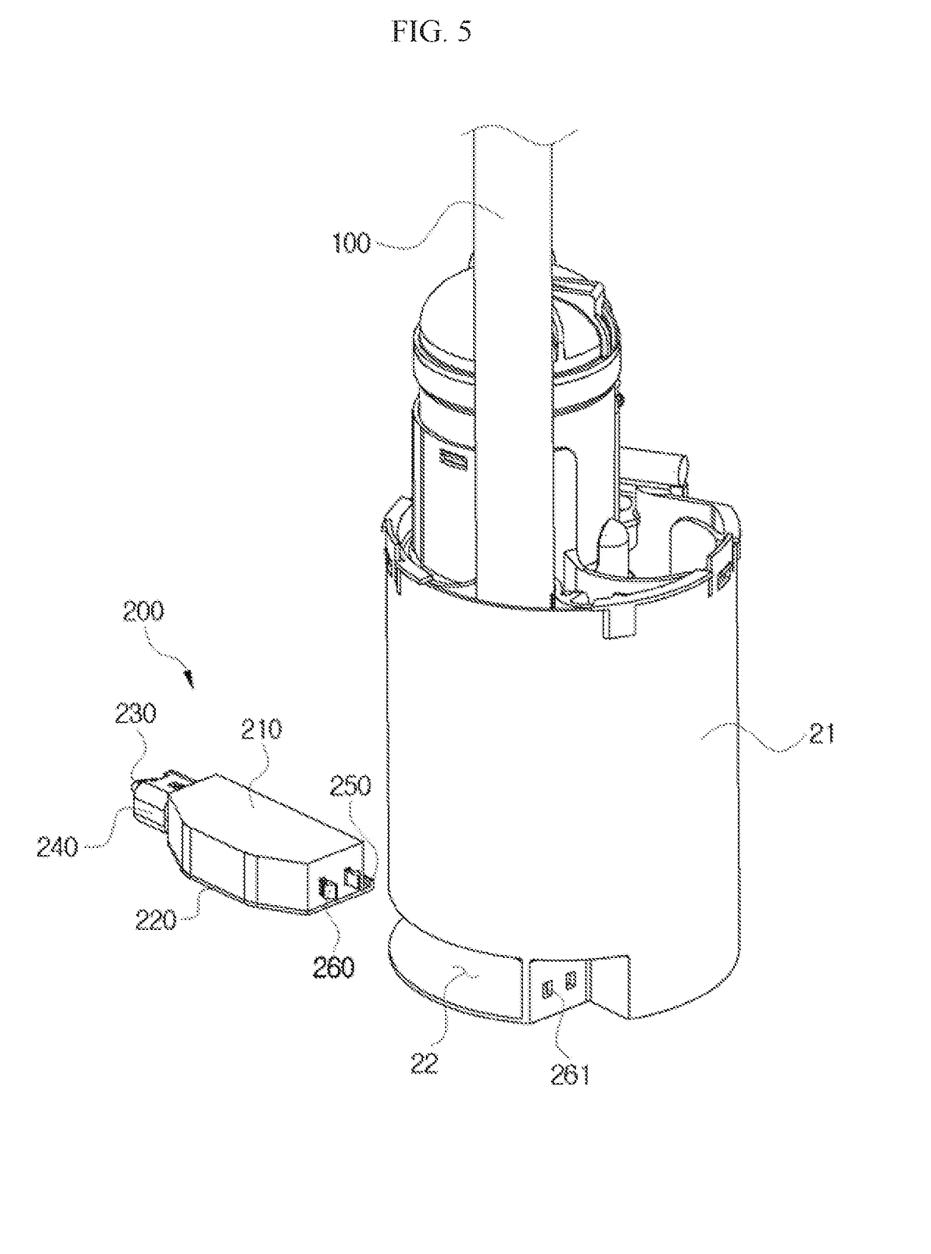
FIG. 5 is a perspective view illustrating the state in which the fuel pump module according to an exemplary embodiment of the present invention and the fuel measuring part are separated from each other when being viewed from a different angle.
Figure 6:
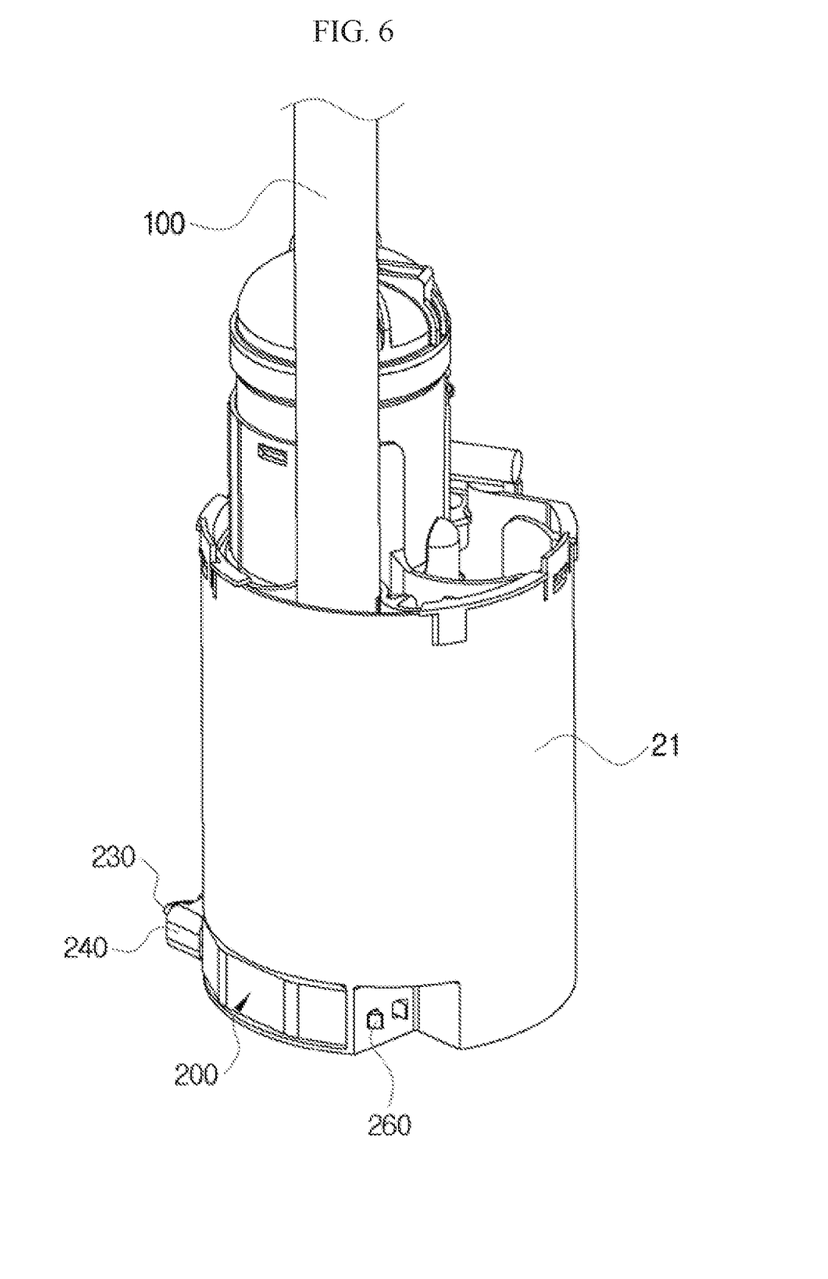
FIG. 6 is a perspective view illustrating a state in which the fuel measuring part is coupled to the fuel pump module according to an exemplary embodiment of the present invention when being viewed from a different angle.

Further, as illustrated in FIGS. 5 and 6, the fuel measuring part 200 has a fixing protrusion 260 formed to be fixedly coupled to the reservoir part 21. In addition, the reservoir part 21 is configured to include a fixing groove 261 to which the fixing protrusion 260 is inserted.

That is, the fuel measuring part 200 is sliding-inserted into the fuel measurement insertion space 22 of the reservoir part 21 by the first sliding part 250 and the second sliding part 251, and is fixedly coupled to the reservoir part 21 by the fixing protrusion 260 and the fixing groove 261.

Although the present invention has been described as being limited to a sliding-coupled structure of the first sliding part 250 and the second sliding part 251, and a coupled structure of the fixing protrusion 260 and the fixing groove 261, the structure that the fuel measuring part 200 is coupled to the reservoir part 21 may be variously deformed.

Figure 7:
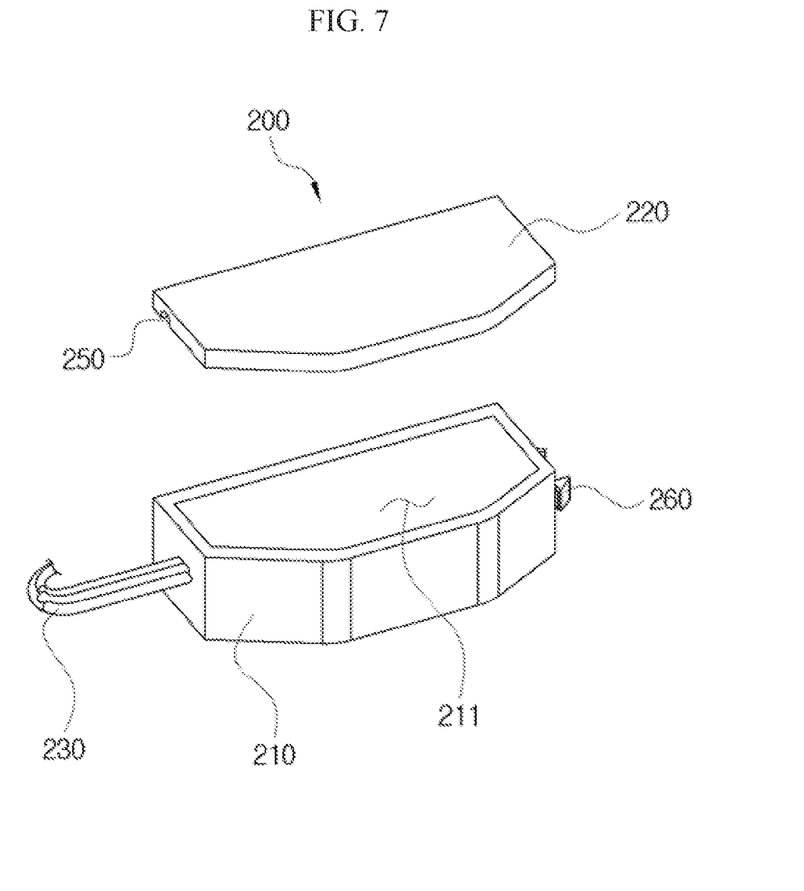
FIG. 7 is an exploded perspective view of the fuel measuring part according to an exemplary embodiment of the present invention.

As illustrated in FIGS. 3 and 7, the fuel measuring part 200 is configured to include a fuel measuring body 210, a cover 220, and a connection line 230.

The fuel measuring body 210 is formed to have an opened one surface, and includes an internal space 211 into which a circuit part and a sensor part are inserted. Since the internal space 211 into which the circuit part and the sensor part are inserted is molded, the circuit part and the sensor part are waterproofed to be protected from the outside.

The cover 220 is coupled to the opened one surface of the fuel measuring body 210.

The connection line 230 is formed to be connected to the circuit part and the sensor part in the fuel measuring body 210 and to be extended to the outside of the fuel measuring body 210. Herein, the connection line 230 is also formed to penetrate through the reservoir part 21 and to be extended to the outside of the fuel tank 10.

In addition, the fuel measuring part 200 is configured to further include a connector part 240. The connector part 240 is coupled to the connection line 230 extended to the outside of the fuel measuring body 210. Such a connector part 240 is connected to the outside of the fuel tank 10.

In addition, the fuel measuring body 210 is configured to further include an ultrasonic wave generation space 270 at a position corresponding to a lower end opening part of the tube 100. The ultrasonic wave generation space 270 is formed to be depressed in the fuel measuring body 210, and includes the ultrasonic wave sensor to generate the ultrasonic wave. The ultrasonic wave generated from the ultrasonic wave generation space 270 is moved to the perforated part in the tube 100 along the lower end opening part, arrives at a surface of the fuel contained in the perforated part, is reflected from the surface of the fuel, and is then returned back to the ultrasonic wave generation space 270. In this case, the height of the fuel is measured by calculating a time at which the ultrasonic wave is reflected from the surface of the fuel and is returned back.

In addition, it is preferably that a diameter of the ultrasonic wave generation space 270 is formed to be smaller than an inner diameter of the tube 100. The reason is because when the diameter of the ultrasonic wave generation space 270 is greater than the inner diameter of the tube 100, the ultrasonic wave is emitted to the outside of the tube 100, which may cause a distorted height of the fuel to be measured.

In this case, the tube 100 is formed so that the fuel is circulated through upper end and lower end opening parts thereof.

Figure 8A:
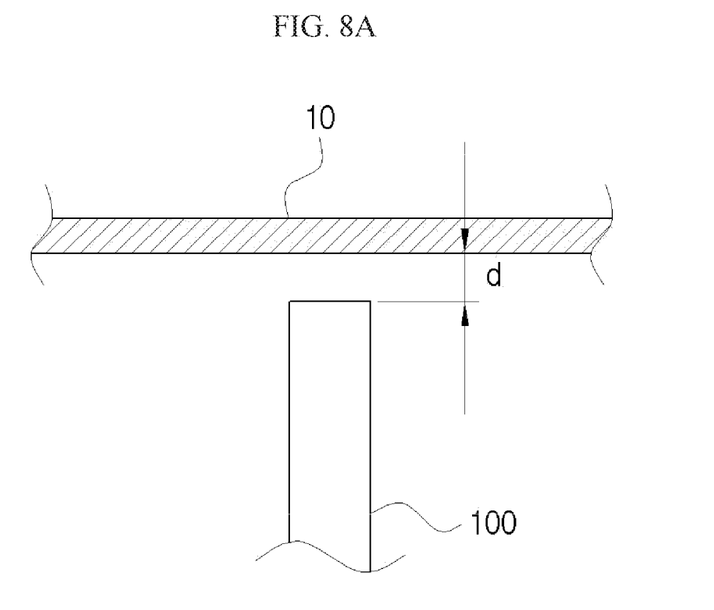
FIGS. 8A and 8B is an enlarged cross-sectional view illustrating a tube and a fuel tank according to an exemplary embodiment of the present invention.
Figure 8B:
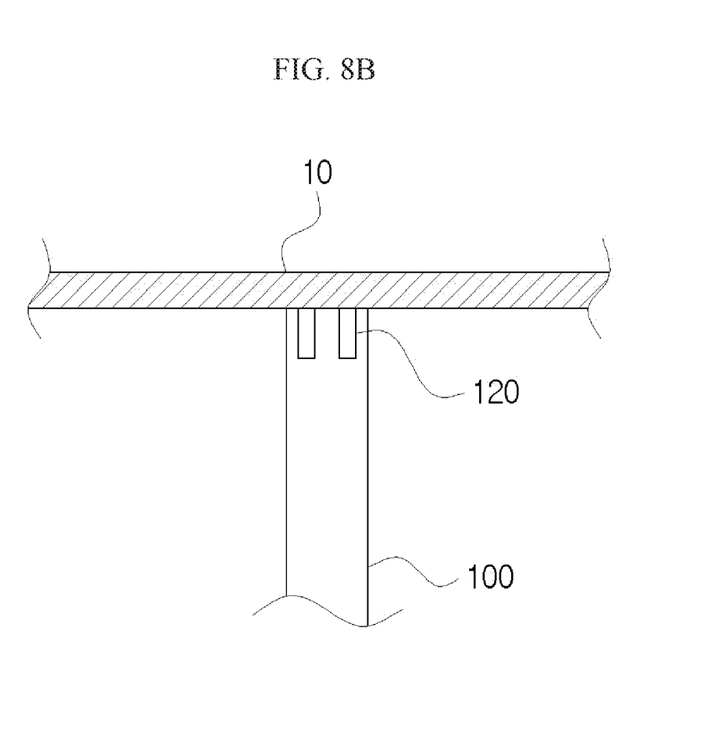

In more detail, as illustrated in FIGS. 8A and 8B, an upper end of the tube 100 is formed to be spaced apart from the fuel tank 10 by a predetermined distance d, or has a circulation hole 120 formed to circulate air and fuel into the tube 100.

In addition, as illustrated in FIG. 4, the reservoir part 21 including the tube 100 and the fuel measuring part 200 are formed to be spaced apart from each other by a predetermined distance d' so that the fuel in the fuel tank 10 is able to be circulated. That is, the fuel measuring part 200 is formed to be spaced apart from the reservoir part by the predetermined distance d' so that the fuel is circulated.

Since the tube 100 is formed so that the fuel is circulated from the upper end and the lower end thereof to the perforated part therein, a height of the fuel in the perforated part and a height of the fuel in the fuel tank are the same as each other. In this case, when the height of the fuel in the perforated part is measured using the ultrasonic wave, the height of the fuel in the fuel tank may be measured. In addition, even in a case in which the fuel tank is tilted, the height of the fuel in the tube 100 having a narrow pipe shape is not significantly changed. For example, when the fuel tank 10 is tilted in one direction, heights of the fuel of both sides of the fuel tank 10 are differently measured. However, since the height of the fuel in the perforated part is contained in the narrow tube 100, the height of the fuel in the tube 100 is not significantly changed even in the case in which the fuel tank 10 is tilted in one direction. In this case, when the height of the fuel in the tube 100 is measured, the height of the fuel may be accurately measured even in the case in which the fuel tank 10 is tilted.

As described above, the fuel pump module according to the present invention may reduce the manufacturing process and costs by integrally installing the ultrasonic wave sensor in the fuel tank module.

In addition, the fuel pump module according to the present invention may accurately measure the height of the fuel in the fuel tank without distorting the propagation time of the ultrasonic wave by moving the ultrasonic wave into the tube.

Hereinabove, although the exemplary embodiments of the present invention have been described, it should be understood that the technical spirit of the present invention is not limited to or construed as the exemplary embodiments, and it will be understood that various changes and improvements apparent to those skilled in the art are made without departing from the scope of the invention claimed in the following claims.

What is claimed is:

1. A fuel pump module for measuring a height of fuel using an ultrasonic wave, the fuel pump module comprising:
    a reservoir part provided to an outer surface of the fuel pump module;
    a tube provided to the reservoir part, having a perforated part, and formed to be extended in a vertical direction of the reservoir part; and
    a fuel measuring part coupled to a lower portion of the reservoir part and having a sensor part measuring a height of fuel in a fuel tank at a position corresponding to the perforated part;
    wherein the fuel measuring part includes a first sliding part formed to be slidingly coupled to the reservoir part, and
    the reservoir part includes a second sliding part formed to correspond to the first sliding part.

2. The fuel pump module of claim 1, wherein the fuel measuring part includes a fixing protrusion formed to be fixedly coupled to the reservoir part, and
    wherein the reservoir part includes a fixing groove coupled to the fixing protrusion.

3. The fuel pump module of claim 1, wherein the fuel measuring part includes:
    a fuel measuring body having one surface formed to be opened and including a circuit part and the sensor part which are molded therein;
    a connection line connected to the circuit part and the sensor part and extended to an outside of the fuel measuring body; and
    a cover coupled to the one surface of the fuel measuring body.

4. The fuel pump module of claim 3, wherein the fuel measuring body further includes a connector part coupled to the connection line and connected to an outside of the fuel tank.

5. The fuel pump module of claim 1, wherein the fuel measuring part includes an ultrasonic wave generation space formed to be depressed in a position corresponding to a lower end of the tube and including the sensor part to generate an ultrasonic wave.

6. The fuel pump module of claim 5, wherein a diameter of the ultrasonic wave generation space is formed to be smaller than an inner diameter of the tube.

7. The fuel pump module of claim 1, wherein the tube is formed to be extended in a vertical direction from the reservoir part to an upper end in the fuel tank.

8. The fuel pump module of claim 7, wherein the tube is coupled to the upper end in the fuel tank, and has a circulation hole formed to circulate air and fuel in the fuel tank.

9. The fuel pump module of claim 7, wherein the tube and the fuel measuring part are formed to be spaced apart from each other so that the fuel in the fuel tank is circulated.

* * * * *